United States Patent
Ishida et al.

(10) Patent No.: US 11,034,585 B2
(45) Date of Patent: Jun. 15, 2021

(54) METHOD FOR CONTROLLING CONCENTRATION OF SOLID CONTENT AND METHOD FOR PRODUCING TRICHLOROSILANE

(71) Applicant: TOKUYAMA CORPORATION, Yamaguchi (JP)

(72) Inventors: Junichi Ishida, Yamaguchi (JP);
Masami Enokuchi, Yamaguchi (JP);
Isao Yamashita, Yamaguchi (JP);
Yoshikazu Kodama, Yamaguchi (JP);
Hiroyuki Nishimura, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 161 days.

(21) Appl. No.: 16/342,887

(22) PCT Filed: Oct. 6, 2017

(86) PCT No.: PCT/JP2017/036493
§ 371 (c)(1),
(2) Date: Apr. 17, 2019

(87) PCT Pub. No.: WO2018/074269
PCT Pub. Date: Apr. 26, 2018

(65) Prior Publication Data
US 2019/0248659 A1    Aug. 15, 2019

(30) Foreign Application Priority Data
Oct. 19, 2016   (JP) .............................. JP2016-205357

(51) Int. Cl.
*C01B 33/107*    (2006.01)
(52) U.S. Cl.
CPC ........ *C01B 33/1071* (2013.01); *C01B 33/107* (2013.01)

(58) Field of Classification Search
CPC .......................... C01B 33/107; C01B 33/1071
See application file for complete search history.

(56) References Cited

U.S. PATENT DOCUMENTS 4,178,796 A * 12/1979 Zwicker ................. G01N 15/04
                                                           73/61.68
5,246,682 A *  9/1993 Ruff ......................... A62D 3/35
                                                           423/348
(Continued)

FOREIGN PATENT DOCUMENTS

EP      2 540 666 A1    1/2013
JP      60-53043        4/1985
(Continued)

OTHER PUBLICATIONS

International Search Report for PCT/JP2017/036493, dated Nov. 7, 2017, 2 pages.
(Continued)

*Primary Examiner* — Ngoc-Yen Nguyen
(74) *Attorney, Agent, or Firm* — Casimir Jones, SC; Robert A. Goetz

(57) ABSTRACT

Realized is a solid substance concentration managing method which allows quick detection of an abnormality in a chemical reactor. The present invention is an invention of a solid substance concentration managing method of managing a concentration of a solid substance which is contained in a residue that is discharged in a reaction product gas processing step included in a trichlorosilane producing method, the solid substance concentration managing method including a concentration measuring step of measuring the concentration of the solid substance which is contained in an after-crystallization residue that is obtained by crystallizing part of aluminum chloride.

5 Claims, 1 Drawing Sheet

(56) References Cited

U.S. PATENT DOCUMENTS

| | | | |
|---|---|---|---|
| 2004/0042949 A1 | 3/2004 | Block | |
| 2004/0047797 A1* | 3/2004 | Block | C01B 33/029 423/349 |
| 2009/0238748 A1* | 9/2009 | Kitagawa | C01B 33/10778 423/342 |
| 2012/0301385 A1 | 11/2012 | Akiyoshi et al. | |
| 2014/0204379 A1* | 7/2014 | Suzuki | G01N 21/532 356/338 |

FOREIGN PATENT DOCUMENTS

| | | |
|---|---|---|
| JP | 2005-29428 | 2/2005 |
| JP | 2006-1804 | 1/2006 |
| JP | 2011-168443 | 9/2011 |
| JP | 2016-28807 | 3/2016 |
| WO | 02/38497 A1 | 5/2002 |
| WO | 2011/056959 A2 | 5/2011 |

OTHER PUBLICATIONS

English Translation of International Preliminary Report on Patentability (Chapter II) for PCT/JP2017/036493, dated Apr. 25, 2019, 5 pages.

Extended EP Search Report for EP Patent Application No. 17862827.7, dated Mar. 19, 2020, 7 pages.

* cited by examiner

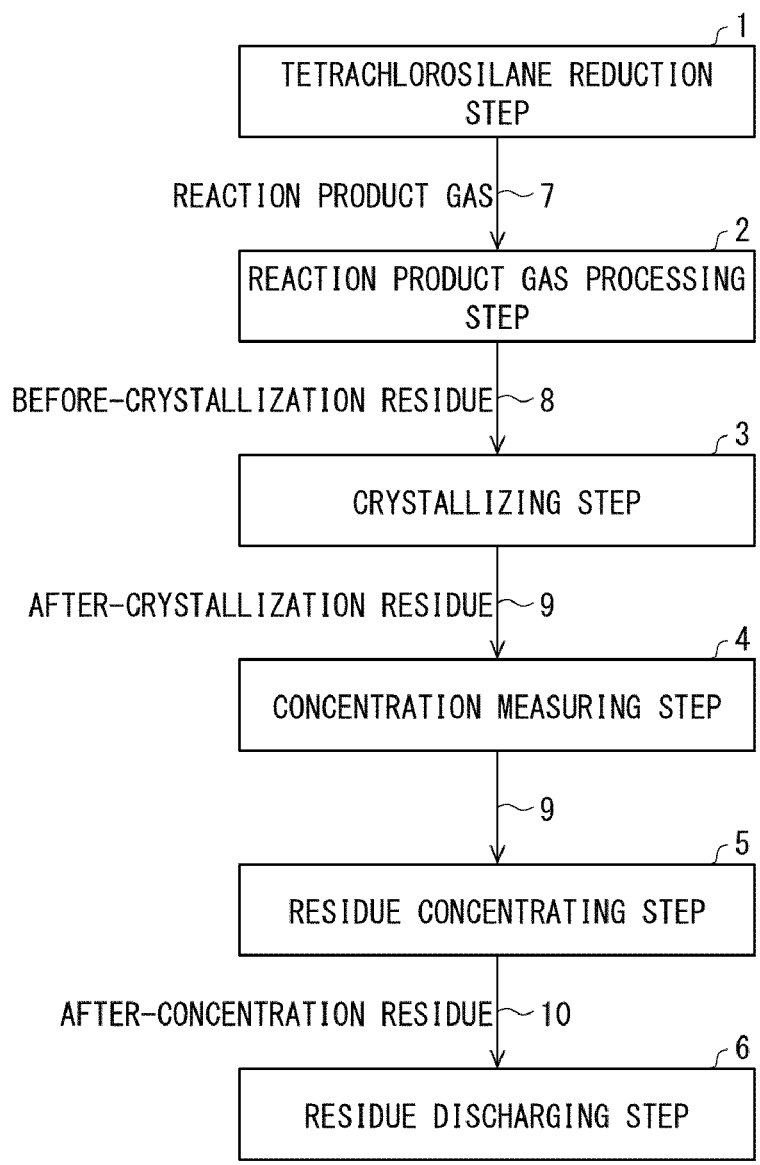

METHOD FOR CONTROLLING CONCENTRATION OF SOLID CONTENT AND METHOD FOR PRODUCING TRICHLOROSILANE

TECHNICAL FIELD

The present invention relates to a solid substance concentration managing method and a trichlorosilane producing method.

BACKGROUND ART

Highly pure trichlorosilane ($SiHCl_3$) is used to produce polycrystalline silicon which is used as materials of a semiconductor, a solar cell, and the like. Trichlorosilane is obtained through, for example, the following reaction. First, silicon (Si) and hydrogen chloride, each of which is a raw material, are reacted with each other. By so doing, trichlorosilane is produced as a result of a main reaction shown by Formula (1), while tetrachlorosilane ($SiCl_4$) is produced as a result of a side reaction shown by Formula (2). Tetrachlorosilane is recovered and then reused, so that tetrachlorosilane is converted into trichlorosilane as shown by Formula (3). Alternatively, in some cases, trichlorosilane is produced through a reaction shown by Formula (3) without use of hydrogen chloride.

$$Si + 3HCl \rightarrow SiHCl_3 + H_2 \quad (1)$$

$$Si + 4HCl \rightarrow SiCl_4 + 2H_2 \quad (2)$$

$$3SiCl_4 + 2H_2 + Si \rightarrow 4SiHCl_3 \quad (3)$$

For example, Patent Literature 1 discloses a trichlorosilane producing method including, as individually independent processes, (i) a first production process for producing trichlorosilane by reacting metal silicon and hydrogen chloride with each other and (ii) a second production process for producing trichlorosilane by reacting metal silicon, tetrachlorosilane, and hydrogen with each other, the trichlorosilane producing method being characterized in that (a) from a reaction product gas which is obtained by the first production process and which contains trichlorosilane, the trichlorosilane is condensed and thereby separated and (b) a waste gas obtained by condensing and thereby separating the trichlorosilane is supplied to the second production process as a source of hydrogen.

CITATION LIST

Patent Literature

[Patent Literature 1]
Japanese Patent Application Publication, Tokukai, No. 2011-168443

SUMMARY OF INVENTION

Technical Problem

However, a conventional technique as described above has room for improvement in terms of quickly detecting an abnormality in a chemical reactor used to produce trichlorosilane.

The present invention has been made in view of the above problem, and an object of the present invention is to realize a solid substance concentration managing method and a trichlorosilane producing method, each of which allows quick detection of an abnormality in a chemical reactor.

Solution to Problem

In order to attain the above object, the inventors of the present invention carried out diligent studies, and found that it is possible to promptly detect an abnormality in a chemical reactor by measuring a concentration of a solid substance which is contained in a residue discharged in a reaction product gas processing step.

A solid substance concentration managing method in accordance with an embodiment of the present invention is a solid substance concentration managing method of managing a concentration of a solid substance which is contained in a residue that is discharged in a reaction product gas processing step included in a trichlorosilane producing method of producing trichlorosilane by reacting metal silicon, tetrachlorosilane, and hydrogen with each other, the solid substance concentration managing method including: a concentration measuring step of measuring the concentration of the solid substance which is contained in an after-crystallization residue that is obtained in a crystallizing step of crystallizing part of aluminum chloride, contained in the residue, by cooling the residue.

Advantageous Effects of Invention

According to the present invention, it is possible to (i) quickly detect an abnormality in a chemical reactor located upstream of a concentration measuring step and (ii) give feedback on a result of detection. Furthermore, it is possible to accurately understand a concentration of slurry in a downstream step. Therefore, it is also possible to increase a recovery rate of tetrachlorosilane.

BRIEF DESCRIPTION OF DRAWINGS

FIG. 1 is a view schematically illustrating steps taken until a residue, which has been generated during production of trichlorosilane, is discharged.

DESCRIPTION OF EMBODIMENTS

The following description will discuss an embodiment of the present invention in detail. Unless otherwise specified herein, a numerical range "A to B" means "not less than A (equal to or more than A) and not more than B (equal to or less than B)".

A solid substance concentration managing method in accordance with an embodiment of the present invention is a solid substance concentration managing method of managing a concentration of a solid substance which is contained in a residue that is discharged in a reaction product gas processing step included in a trichlorosilane producing method of producing trichlorosilane by reacting metal silicon, tetrachlorosilane, and hydrogen with each other, the solid substance concentration managing method including: a concentration measuring step of measuring the concentration of the solid substance which is contained in the residue that is obtained by crystallizing part of aluminum chloride, contained in the residue, by cooling the residue. A trichlorosilane producing method in accordance with an embodiment of the present invention is a trichlorosilane producing method including, as a step, the solid substance concentration managing method.

FIG. 1 is a view schematically illustrating steps taken until a residue, which has been generated during production of trichlorosilane, is discharged. First, an outline of the trichlorosilane producing method will be described below, and then the solid substance concentration managing method will be described.

[1. Trichlorosilane Producing Method]

The trichlorosilane producing method can mainly include a tetrachlorosilane reduction step 1 and a reaction product gas processing step 2.

<1-1. Tetrachlorosilane Reduction Step 1>

First, metal silicon, which is a raw material, is reacted with tetrachlorosilane and hydrogen with use of a chemical reactor or the like. Such a step of reacting metal silicon, tetrachlorosilane, and hydrogen with each other is herein referred to as a tetrachlorosilane reduction step 1. A main reaction carried out in the tetrachlorosilane reduction step 1 is represented by the following Formula (3).

$$3SiCl_4 + 2H_2 + Si \rightarrow 4SiHCl_3 \qquad (3)$$

Examples of metal silicon used for the reaction include solid substances each containing a silicon element in a metallic state, such as metallurgical metal silicon, ferrosilicon, and polysilicon. As metal silicon, publicly known metal silicon is used without any limitation. Note that metal silicon can contain an impurity such as an iron compound, and a component and an amount of the iron compound are not particularly limited. As metal silicon, metal silicon which is in finely powdered form and which has an average particle diameter of 100 μm to 300 μm is typically used.

As hydrogen used for the reaction, any of various kinds of hydrogen which are industrially available can be used. Moreover, hydrogen or the like discharged in the process of production of polysilicon can be also used after being refined as appropriate.

As tetrachlorosilane used for the reaction, tetrachlorosilane can be reused which is produced as a by-product in a case where metal silicon and hydrogen chloride are reacted with each other. Alternatively, tetrachlorosilane can be reused which is discharged in the process of production of polysilicon and is recovered as appropriate.

Note that, in the reaction, it is preferable to use a catalyst so as to increase a rate of the reaction and efficiently produce trichlorosilane with high selectivity. As the catalyst, a catalyst which has been conventionally used in this reaction system can be used. For example, a copper-based catalyst such as copper powder, copper chloride, or copper silicide is used. The catalyst is used in an amount of 0.1% by mass to 40% by mass, particularly 0.2% by mass to 20% by mass with respect to metal silicon on a copper basis. Note that the catalyst can be used together with an iron component or together with an iron component and an aluminum component.

As the chemical reactor used for the reaction, a publicly known chemical reactor can be used without any particular limitation. Specific examples of the chemical reactor include a fixed-bed chemical reactor and a fluidized-bed chemical reactor. Of such chemical reactors, the fluidized-bed chemical reactor is preferably used in that it is possible to consecutively feed metal silicon, tetrachlorosilane, and hydrogen and, accordingly, possible to consecutively produce trichlorosilane.

Respective amounts of metal silicon, tetrachlorosilane, and hydrogen fed to the chemical reactor can be determined as appropriate in consideration of a type, capacity, and the like of the chemical reactor. A ratio of hydrogen to tetrachlorosilane is such that generally 1 mol to 5 mol of hydrogen is used with respect to 1 mol of tetrachlorosilane, more preferably 1 mol to 3 mol of hydrogen is used with respect to 1 mol of tetrachlorosilane. Note that a rate of feed can be set as appropriate depending on the type and a size of the chemical reactor used. For example, in a case where the fluidized-bed chemical reactor is used, tetrachlorosilane and hydrogen are fed at such respective rates that a rate of flow of tetrachlorosilane and a rate of flow of hydrogen allow a fluidized bed to be formed. Note also that tetrachlorosilane and hydrogen can be fed after being diluted with an inert gas (nitrogen gas, argon gas, or the like) which is not involved in the reaction.

A reaction temperature in the reaction can be determined as appropriate in consideration of a material and the capacity of the chemical reactor, the catalyst used, and the like. Generally, the reaction temperature is set to a range of 400° C. to 700° C., particularly 450° C. to 600° C.

As used herein, a product obtained by carrying out the tetrachlorosilane reduction step 1 will be referred to as a reaction product gas 7.

The reaction product gas 7 can contain metal silicon particles. Therefore, the chemical reactor is preferably provided with a dust collector. This allows (i) the reaction product gas to pass through the dust collector and accordingly (ii) a solid substance, such as the metal silicon particles, to be removed. Examples of the dust collector include a filter and a centrifugal dust collector. Of such dust collectors, the centrifugal dust collector is preferable. Examples of the centrifugal dust collector include a cyclone powder separator. In the cyclone powder separator, air flows downward in a helical manner along an inner wall. With this, particles to be removed are brought into contact with the inner wall, and are collected at a lower end of the cyclone powder separator. The cyclone powder separator is preferable because (i) the cyclone powder separator allows fine particles to be removed, (ii) the cyclone powder separator is easily installed, maintained, and managed, and (iii) the cyclone powder separator can be used at a high pressure and a high temperature.

<1-2. Reaction Product Gas Processing Step 2>

The reaction product gas 7 can contain, in addition to trichlorosilane, for example, unreacted tetrachlorosilane, unreacted hydrogen, and the other chlorosilane compound as well as metal silicon particles which could not be removed by the dust collector. Further, in the tetrachlorosilane reduction step 1, metal silicon used as a raw material can contain an impurity, such as aluminum, in an amount of typically 0.01% by mass to 10% by mass. Therefore, the reaction product gas 7 can contain aluminum chloride and the like. Accordingly, the trichlorosilane producing method preferably includes a step of further processing the reaction product gas so as to refine trichlorosilane contained in the reaction product gas. As used herein, this step will be referred to as a reaction product gas processing step 2.

Note that, as used herein, a chlorosilane compound means a compound which contains a chlorine element and a silicon element. Examples of the chlorosilane compound include trichlorosilane, tetrachlorosilane, low-boiling silane, pentachlorosilane, and hexachlorosilane.

For example, the reaction product gas processing step 2 preferably includes a step of cleaning the reaction product gas 7. This makes it possible to trap the solid substance (for example, metal silicon which could not be removed by the dust collector) which can be contained in the reaction product gas 7. Examples of a cleaning method include a bubbling method and a shower method.

According to the bubbling method, the reaction product gas 7 is cleaned by being blown into a silane solution layer and being subjected to bubbling. According to the shower method, the reaction product gas 7 is cleaned by being brought into contact with a silane solution sprayed in the form of a shower. Such cleaning can be carried out through multiple stages. For example, after the reaction product gas 7 is cleaned by the bubbling method, the reaction product gas 7 can be cleaned by the shower method. This is preferable because it is possible to more effectively remove an impurity contained in the reaction product gas 7.

The silane solution can contain trichlorosilane, tetrachlorosilane, the other chlorosilane compound, and the like. In particular, as the silane solution, it is preferable to use part of a condensate which is obtained by cooling the reaction product gas (later described). A temperature of the silane solution is not particularly limited, provided that the silane solution can remain liquid. The temperature of the silane solution is generally 20° C. to 60° C., particularly preferably 30° C. to 50° C. The temperature of the silane solution is preferably 40° C. to 50° C. so that the cleaning is efficiently carried out.

Further, the reaction product gas processing step 2 preferably includes a step of cooling the reaction product gas 7 so as to condense and thereby separate trichlorosilane. Note, here, that a means for cooling the reaction product gas 7 so as to condense trichlorosilane is not particularly limited, provided that it is possible to cool the reaction product gas 7 to a temperature equal to or lower than a temperature at which various chlorosilane compounds are condensed, and a publicly known cooling means can be employed. A temperature inside a device (for example, a buffer drum) in which the reaction product gas 7 is cooled is preferably not higher than −10° C., more preferably −60° C. to −30° C.

Moreover, it is preferable to separate, as a distillate, the chlorosilane compound which contains trichlorosilane as a main component, by distilling a condensate obtained from the reaction product gas 7. For distillation, it is possible to use, for example, a distillation column which has a reboiler. As trays of the distillation column, trays which are typically used can be used without any limitation. For example, a packed column which is packed with, for example, a regular packing material or an irregular packing material, a bubble-cap column, a perforated-plate column, or the like can be used. The condensate can be fed to any part of the distillation column. However, it is more preferable to directly feed the condensate to a bottom of the distillation column so as to prevent the trays from being soiled. The reboiler which applies energy that causes the chlorosilane compound to be evaporated can be a reboiler which directly heats the bottom, whose periphery is jacketed, of the distillation column. Alternatively, the reboiler can be a heat exchanger which is provided outside the bottom of the distillation column. Alternatively, the reboiler can be a heat exchanger which is provided inside the bottom of the distillation column.

As such a heat exchanger, a shell and tube heat exchanger is generally suitably employed so that a larger heat transfer area is given. Alternatively, a coil heat exchanger, an electric heater, or the like can be employed. Note that scales made of aluminum chloride may be formed in the heat exchanger which applies energy for the distillation, in a case where a chlorosilane solution remains in the heat exchanger and accordingly aluminum chloride is highly concentrated. Therefore, the heat exchanger preferably has a structure which makes it difficult for the chlorosilane solution to remain in the heat exchanger. As a method of making it difficult for the chlorosilane solution to remain in the heat exchanger, a method in which convection caused by heating is used can be employed. Alternatively, a method in which the chlorosilane solution is forcibly caused to flow with use of a pump or the like can be suitably employed.

There is a considerably large difference between (i) a boiling point of the chlorosilane compound which should be recovered and refined and (ii) a boiling point of the impurity which should be separated and removed. Therefore, as the distillation, it is not particularly necessary to carry out high level rectification. In other words, it is possible to carry out the distillation in a range in which distillation operation can be maintained, and a reflux ratio can be approximately 0.1 to 1.

A temperature inside the distillation column is preferably not lower than 50° C., preferably 70° C. to 150° C., more preferably 80° C. to 120° C.

Note that an amount of solid aluminum chloride which is crystallized in a crystallizing step (later described) depends on a difference between (i) a concentration of aluminum chloride which is dissolved in a bottoms liquid and (ii) a saturated solubility after cooling. Therefore, the concentration of aluminum chloride which is dissolved in the bottoms liquid is preferably as high as possible, because it is possible to increase efficiency of removing aluminum chloride while reducing an amount of dissolved aluminum chloride which is processed and circulated.

Meanwhile, in order to (i) prevent aluminum chloride from depositing in the reboiler and thereby causing blockage in the reboiler and accordingly (ii) achieve stable long-term operation, it is preferable to adjust the concentration of aluminum chloride, which is dissolved in the bottoms liquid, to be lower than the saturated solubility at a temperature of the bottoms liquid. For example, in a case where the temperature of the bottoms liquid is not lower than 50° C., the concentration of aluminum chloride which is dissolved in the bottoms liquid is kept in a range of preferably 0.5% by mass to 1.8% by mass, more preferably 0.8% by mass to 1.5% by mass.

Note that tetrachlorosilane contained in the chlorosilane compound thus separated can be reused in the above-described tetrachlorosilane reduction step 1 after being subjected to a refining step. Meanwhile, trichlorosilane can be used as a raw material from which polysilicon is produced. Meanwhile, the above-described aluminum chloride can be separated as a solid substance, because the boiling point of aluminum chloride is higher than that of the chlorosilane compound.

The solid substance separated by the cleaning and/or the distillation is recovered as a residue (slurry) containing a liquid chlorosilane compound. As used herein, a residue which has been obtained by carrying out the reaction product gas processing step 2 including the cleaning and/or the distillation and which has not yet been transferred to the crystallizing step (later described) will be referred to as a before-crystallization residue 8.

<1-3 Crystallizing Step 3>

The trichlorosilane producing method can include a crystallizing step 3 of crystallizing part of aluminum chloride by cooling the before-crystallization residue 8 obtained in the reaction product gas processing step 2. Aluminum chloride which is crystallized in the crystallizing step 3 is present in a stable state as a solid substance, without being re-dissolved even in a case where the aluminum chloride is heated in a subsequent step. Furthermore, aluminum chloride which is crystallized has significantly good re-dispersibility, and therefore hardly causes a trouble, that is, hardly deposits in the reboiler and the like and accordingly hardly causes blockage in the reboiler and the like, unless the residue is let to remain in the reboiler and the like. The residue thus obtained, which contains crystallized aluminum chloride, will be referred to as an after-crystallization residue 9 herein.

Note that any one of the residue which has not been subjected to the above-described distillation (for example, the residue which has been subjected to merely the cleaning) and the residue which has been subjected to the distillation can be transferred to the crystallizing step 3, but both of the residue which has not been subjected to the above-described distillation and the residue which has been subjected to the distillation are preferably transferred to the crystallizing step 3 from the viewpoint of recovery of the chlorosilane compound.

As a device which carries out the crystallizing step 3, a liquid cooling device, inside or outside which a cooling medium is caused to flow, can be used. Note that, in so doing, aluminum chloride may slightly deposit on a wall surface, which is cooled, of the device, and scales made of aluminum chloride may be formed. This may cause a gradual decrease in heat exchange ability for cooling. However, scales thus formed are extremely easy to remove. Therefore, it is preferable to provide, to the wall surface to be cooled, a means for scraping the scales off. This makes it possible to easily remove the scales, even in a case where the scales are formed. Examples of a method of scraping the scales off include: a method in which a paddle, a helical ribbon, or the like is rotated with use of an electric motor; and a method in which a sponge ball or the like is caused to flow together with the residue. Any of such methods can be suitably employed.

A temperature inside the device which carries out the crystallizing step 3 is preferably lower than an outside temperature, because scales are prevented from being formed in a pipe after crystallization. In general, the temperature inside the device which carries out the crystallizing step 3 is set to not higher than −10° C. By carrying out the crystallization at such a sufficiently low temperature, it is possible to prevent the crystallization from further progressing and accordingly possible to prevent scales from being formed, even in a case where the pipe after the cooling is further cooled by, for example, external air during winter. This makes it possible to suppress re-dissolution in a liquid during re-heating in a subsequent step. Further, a pressure inside the device which carries out the crystallization is not particularly limited, from the viewpoint of the crystallization. However, from the viewpoint of transfer of the liquid to a next step without use of a pump, the pressure can be 600 kPa to 400 kPa (gage pressure) or can be alternatively 450 kPa to 550 kPa (gage pressure).

<1-4 Residue Concentrating Step 5>

The trichlorosilane producing method can include a residue concentrating step 5 of concentrating the residue (after-crystallization residue 9), obtained in the crystallizing step, by heating the residue (after-crystallization residue 9). This allows the liquid contained in the residue to be evaporated, and accordingly allows the solid substance to be further concentrated. That is, it is possible to further recover a usable chlorosilane compound and then dispose of the residue. The residue thus concentrated will be referred to as an after-concentration residue 10 herein.

A temperature inside a device which carries out the residue concentrating step 5 is preferably 70° C. to 90° C., more preferably 80° C. to 85° C. A pressure inside the device which carries out the residue concentrating step 5 is preferably 80 kPa to 120 kPa (gage pressure), more preferably 90 kPa to 110 kPa (gage pressure). The above temperature and the above pressure easily cause a temperature difference, and therefore allow a reduction in heat transfer area of the device. In other words, it is possible to reduce a size of the device. It is therefore possible to more efficiently concentrate the residue.

<1-5 Residue Discharging Step 6>

The trichlorosilane producing method can include a residue discharging step 6 of discharging the residue obtained in the process of production of trichlorosilane. Note that FIG. 1 illustrates that the residue transferred to the residue discharging step 6 is the after-concentration residue 10. However, the residue transferred to the residue discharging step 6 is not limited to the after-concentration residue 10, and can be the before-crystallization residue 8 or the after-crystallization residue 9. The residue discharging step 6 is carried out by, for example, transferring the residue to a facility such as a disposal pit.

[2. Solid Substance Concentration Managing Method]

The solid substance concentration managing method in accordance with an embodiment of the present invention is a solid substance concentration managing method of managing a concentration of a solid substance which is contained in a residue that is discharged in a reaction product gas processing step included in a trichlorosilane producing method of producing trichlorosilane by reacting metal silicon, tetrachlorosilane, and hydrogen with each other (that is, the above-described trichlorosilane producing method), the solid substance concentration managing method including: a concentration measuring step of measuring the concentration of the solid substance which is contained in an after-crystallization residue that is obtained in a crystallizing step of crystallizing part of aluminum chloride, contained in the residue, by cooling the residue. The trichlorosilane producing method preferably includes, as a step, the solid substance concentration managing method in accordance with an embodiment of the present invention.

According to the above configuration, by detecting a variation of a concentration of a solid substance, it is possible to (i) quickly detect an abnormality in a chemical reactor (and a dust collector) located upstream of a concentration measuring step and (ii) give feedback. This can ultimately increase production efficiency of the trichlorosilane producing method.

<2-1. Concentration Measuring Step 4>

A concentration measuring step 4 is a step of measuring a concentration of the solid substance contained in the after-crystallization residue 9. That is, the concentration measuring step 4 is carried out after the crystallizing step 3. This makes it possible to measure the concentration of the solid substance which contains (i) metal silicon particles contained in the residue and (ii) crystallized aluminum chloride. For example, in a case where the reaction does not normally progress in the chemical reactor or in a case where the metal silicon particles are not normally removed by the dust collector, the concentration of the solid substance can increase. According to the above configuration, it is possible to quickly detect an increase in concentration of the solid substance. Furthermore, according to the above configuration, by understanding the concentration of the solid substance contained in the after-crystallization residue 9, it is possible to accurately understand a concentration of the residue in a downstream step. Therefore, it is also possible to increase a recovery rate of tetrachlorosilane.

The concentration measuring step 4 is preferably carried out before the residue concentrating step 5. This makes it possible to more quickly detect an abnormality in the chemical reactor (and the dust collector) and give feedback.

Furthermore, by thus understanding the concentration of the solid substance before the residue concentrating step 5, it is possible to more accurately understand the concentration of the solid substance in the residue concentrating step 5, which is a downstream step.

That the trichlorosilane producing method "includes, as a step, the solid substance concentration managing method" intends to (i) detect a variation of the concentration of the solid substance and (ii) determine whether or not there is an abnormality. The solid substance concentration managing method in accordance with an embodiment of the present invention can include a step of comparing (a) the concentration of the solid substance, which concentration has been measured in the concentration measuring step, with (b) a reference value set in advance. The solid substance concentration managing method can further include a determining step of determining that there is an abnormality, in a case where the concentration of the solid substance, which concentration has been measured, is equal to or higher than the reference value or in a case where the concentration of the solid substance is beyond the reference value. In a case where an abnormality is thus detected, the chemical reactor and/or the dust collector can be, for example, inspected, repaired, and/or replaced with another.

For example, in a case where a normal value of the concentration of the solid substance after the crystallizing step is 1% by mass to 3% by mass, the reference value is preferably set to 5% by mass, more preferably 4% by mass. For example, in a case where a normal value of the concentration of the solid substance after the residue concentrating step is 10% by mass to 20% by mass, the reference value is preferably set to 50% by mass, more preferably 40% by mass, still more preferably 30% by mass. This allows the concentration to be appropriately managed.

Measurement frequency depends on an overall design of a facility for producing trichlorosilane. For example, the measurement frequency can be once per week, twice per week, or once per day. From the viewpoint of more accurate understanding of the concentration of the solid substance, the measurement frequency is preferably once per day. Further, a time required for measurement is preferably 5 minutes to 20 minutes, more preferably 5 minutes to 15 minutes, still more preferably 5 minutes to 10 minutes, per measurement, in view of balance between accurate measurement and a reduction in manpower.

<2-2. Turbidimeter>

The concentration measuring step can be carried out manually (manual analysis), but is preferably carried out with use of a turbidimeter. The inventors of the present invention found that a value measured by the turbidimeter correlates with a value measured by manual analysis. This makes it possible to automate the measurement of the concentration. A pipe used in the trichlorosilane producing method can have a high pressure. Therefore, in a case where the measurement of the concentration is carried out by manual analysis, sampling operation involves a risk, and it is accordingly necessary to wear an eye protector, a gas mask, a protective suit, and rubber gloves. In a case where it is possible to automate the measurement of the concentration, it is possible to reduce a risk involved in manual analysis and reduce manpower. Furthermore, it is possible to measure the concentration in real time.

The turbidimeter is not particularly limited, provided that the turbidimeter includes a light source and a light receiving element and is capable of measuring turbidity. Examples of the turbidimeter include a transmitted light measurement type turbidimeter, a scattered light measurement type turbidimeter, a transmitted light and scattered light computation type turbidimeter, and an integrating sphere measurement type turbidimeter. The transmitted light measurement type turbidimeter is configured such that a light source emits light from one side of a sample and a light receiving element located on an opposite side from the light source measures transmitted light. The transmitted light measurement type turbidimeter uses a fact that a degree of attenuation of light relates to a concentration of a suspended matter. The scattered light measurement type turbidimeter is configured such that a light receiving element measures light scattered by particles contained in a sample. The scattered light measurement type turbidimeter uses a fact that intensity of scattering relates to a concentration of a suspended matter. The transmitted light and scattered light computation type turbidimeter is configured such that both of transmitted light and scattered light are measured. The transmitted light and scattered light computation type turbidimeter uses a proportional relationship between (i) a ratio between the transmitted light and the scattered light and (ii) a concentration of a suspended matter. The integrating sphere measurement type turbidimeter is configured such that a light source emits light toward a sample and a light receiving element measures scattered light and whole entering light in each of which an integrating sphere is involved. The integrating sphere measurement type turbidimeter uses a proportional relationship between (i) a ratio between the scattered light and the whole entering light and (ii) a concentration of a suspended matter. From the viewpoint of easiness, the transmitted light measurement type turbidimeter is preferably used. Turbidity measured by such a turbidimeter can be managed after being converted into a concentration of a suspended matter or can be alternatively managed as it is.

The turbidimeter is preferably provided to a pipe branching off from a pipe through which the after-crystallization residue 9 is transferred. According to the above configuration, it is possible to suppress clogging of a turbidimeter sample line. Note that the turbidimeter sample line indicates the pipe to which the turbidimeter is provided. For example, the turbidimeter is preferably provided to the middle of a sub pipe which branches off from a main pipe once and returns to the main pipe again, the main pipe being a pipe through which the after-crystallization residue 9 is transferred from the crystallizing step 3 to the residue concentrating step 5 or the residue discharging step 6. Furthermore, in a case where a gravitational direction is regarded as a lower side and an opposite side is regarded as an upper side, the sub pipe preferably branches off from an upper side of the main pipe. This makes it possible to more suppress clogging of the turbidimeter sample line.

A cleaning pipe for cleaning the turbidimeter can be connected to the sub pipe. This allows the turbidimeter to be automatically cleaned. It is preferable to use pure tetrachlorosilane so as to clean the turbidimeter. Cleaning is preferably carried out by causing pure tetrachlorosilane to flow through the sub pipe in a direction opposite to a direction in which the residue flows through the main pipe.

Furthermore, a valve(s) is/are preferably provided to a connection between the sub pipe and the main pipe and/or a connection between the sub pipe and the cleaning pipe. This allows the turbidimeter to carry out batch measurement. Note that the cleaning pipe is preferably connected to part of the sub pipe which part is near the valve provided to the connection between the sub pipe and the main pipe.

Note also that it is preferable to carry out a purge with respect to the light source and the light receiving element of the turbidimeter with use of dry air. This allows a pressure inside a housing of the turbidimeter to remain positive, so that it is possible to prevent fogging of and condensation on an outer surface of a glass which fogging and condensation are caused by external air having entered the housing of the turbidimeter. A pressure of dry air with use of which the purge is carried out is not particularly limited, provided that it is possible to keep the pressure inside the housing of the turbidimeter positive.

A pressure inside each of the above pipes (that is, the pipe through which the after-crystallization residue 9 is transferred and the turbidimeter sample line) can be not less than 100 kPa (gage pressure), can be not less than 300 kPa (gage pressure), or can be not less than 500 kPa (gage pressure). As described above, in a case where the turbidimeter is used, it is possible to automate the measurement of the concentration. Therefore, it is possible to measure the concentration even under a high pressure under which it is dangerous to carry out manual analysis.

SUMMARY

An embodiment of the present invention can be arranged as follows.

[1] A solid substance concentration managing method of managing a concentration of a solid substance which is contained in a residue that is discharged in a reaction product gas processing step included in a trichlorosilane producing method of producing trichlorosilane by reacting metal silicon, tetrachlorosilane, and hydrogen with each other, the solid substance concentration managing method including: a concentration measuring step of measuring the concentration of the solid substance which is contained in an after-crystallization residue that is obtained in a crystallizing step of crystallizing part of aluminum chloride, contained in the residue, by cooling the residue.

[2] The solid substance concentration managing method as set forth in [1], wherein the concentration measuring step is carried out before a residue concentrating step of concentrating the after-crystallization residue.

[3] The solid substance concentration managing method as set forth in [1] or [2], wherein the concentration measuring step is carried out with use of a turbidimeter.

[4] The solid substance concentration managing method as set forth in [3], wherein the turbidimeter is provided to a first pipe which branches off from a second pipe through which the after-crystallization residue is transferred.

[5] The solid substance concentration managing method as set forth in [4], wherein a pressure inside each of the first pipe and the second pipe is not less than 100 kPa (gage pressure).

[6] A trichlorosilane producing method including, as a step, a solid substance concentration managing method recited in any one of [1] through [5].

The present invention is not limited to the embodiments, but can be altered by a skilled person in the art within the scope of the claims. The present invention also encompasses, in its technical scope, any embodiment derived by combining technical means disclosed in differing embodiments.

EXAMPLES

The methods in accordance with an embodiment of the present invention will be described in more detail with reference to Examples. However, the present invention is not limited to such Examples.

Example 1

(Tetrachlorosilane Reduction Step)

A fluidized-bed chemical reactor was used. The fluidized-bed chemical reactor was filled with (i) 35 parts by mass of metal silicon particles having a purity of 98% and an average particle diameter of 150 μm and (ii) 6 parts by mass of metal silicon particles having an average particle diameter of 150 μm and having a copper silicide layer on each surface. At a temperature of 500° C. and a pressure of 0.7 MPaG, a mixed gas containing hydrogen and tetrachlorosilane at a molar ratio of 2.5:1 was fed to the fluidized-bed chemical reactor so that an amount of the mixed gas was 43 Nm³/Hr with respect to 100 parts by mass of a total amount of those metal silicon particles. A resultant mixture was then fluidized so that a fluidized bed was formed. In so doing, a ratio of copper atoms to silicon atoms was 6% by mass. Thereafter, while the metal silicon particles which had no copper silicide layer were being sequentially fed to the fluidized-bed chemical reactor so that a powder level of the fluidized bed was kept constant, a reaction was further continued.

(Reaction Product Gas Processing Step)

A reaction product gas obtained by the above reaction was cleaned by bringing the reaction product gas into contact with part of a condensate, the condensate having been obtained by subsequent condensation of the reaction product gas, the part having been circulated and being sprayed in the form of a shower. A liquid obtained by such cleaning was a chlorosilane liquid containing a silicon fine powder. A concentration of aluminum chloride dissolved in the chlorosilane liquid was 0.5% by mass. The liquid was transferred to a crystallizing step as a before-crystallization residue (1).

Meanwhile, the reaction product gas which had been cleaned was cooled to −30° C. with use of a cooling device. As a result, the condensate was obtained which was made of a chlorosilane liquid which contained 25% by mass of trichlorosilane and 75% by mass of tetrachlorosilane. With use of a distillation column, the condensate was separated into (i) a distillate which contained tetrachlorosilane and trichlorosilane as main components and (ii) a distillation residue which contained, as a main component, tetrachlorosilane containing aluminum chloride. A concentration of aluminum chloride dissolved in the distillation residue was 0.5% by mass. The distillation residue was then transferred to the crystallizing step as a before-crystallization residue (2).

(Crystallizing Step, Residue Concentrating Step)

The before-crystallization residue (1) and the before-crystallization residue (2), which were obtained in the reaction gas processing step, were fed to a jacket cooling type crystallization tank. A temperature in this tank was adjusted to 10° C., and aluminum chloride was deposited.

A resultant after-crystallization residue containing deposited aluminum chloride was next transferred to a residue concentrating step. This residue was heated by a steam jacket of a residue concentrating device so that a liquid contained in the residue was evaporated and a concentration of a solid substance was 20% by mass. Thereafter, the residue was disposed of in a pit. Meanwhile, evaporated chlorosilane was condensed and then returned to the tetrachlorosilane reduction step.

(Concentration Measuring Step)

A turbidimeter sample line was made by attaching, to a pipe through which the after-crystallization residue was transferred from the crystallizing step to the residue concentrating step, a branch pipe, which was partially constituted by a glass pipe, such that the branch pipe branched off from the pipe. An automatic measurement turbidimeter (absorption type turbidimeter AF16N, manufactured by optek-Danulat), which was of a transmitted light measurement type, was provided to the turbidimeter sample line, and turbidity of a liquid passing through the turbidimeter sample line was measured over time.

(Abnormality Detecting Step)

In the tetrachlorosilane reduction step, turbidity measured during steady operation with no abnormality was 1% by mass to 3% by mass, that is, the turbidity had a normal value. Turbidity, measured in a case where a level of the fluidized bed in the fluidized-bed chemical reactor rose, increased to 4% by mass or more. It is thus possible to detect an abnormality in a fluidized-bed chemical reactor by measuring turbidity over time.

There is a system which (i) measures a variation of turbidity over time, (ii) compares, with a normal value, a measured value obtained by an automatic computing device from a measurement signal which has been received by the a turbidimeter, and (iii) raises an alarm, notifying of an abnormality, in a case where the measured value deviates from the normal value by not less than +1.0% by mass. As a result of continuously operating a turbidimeter which employed such a system, it was possible to absolutely detect an abnormality in the fluidized-bed chemical reactor.

INDUSTRIAL APPLICABILITY

The present invention can be suitably used for a trichlorosilane producing method.

REFERENCE SIGNS LIST

1 Tetrachlorosilane reduction step
2 Reaction product gas processing step
3 Crystallizing step
4 Concentration measuring step
5 Residue concentrating step
6 Residue discharging step
7 Reaction product gas
8 Before-crystallization residue
9 After-crystallization residue
10 After-concentration residue

The invention claimed is:

1. A solid substance concentration managing method comprising:
   1) a tetrachlorosilane reduction step of producing trichlorosilane by reacting metal silicon, tetrachlorosilane, and hydrogen with each other with use of a chemical reactor;
   2) a reaction product gas processing step of refining the trichlorosilane contained in a reaction product gas obtained in the tetrachlorosilane reduction step 1);
   3) a crystallizing step of crystallizing part of aluminum chloride, contained in the residue discharged in the reaction product gas processing step 2), by cooling the residue;
   4) a concentration measuring step of, before the residue concentrating step 5), measuring the concentration of the solid substance which is contained in the residue that is obtained in the crystallizing step 3);
   a determining step of (i) detecting a variation of the concentration of the solid substance which concentration is measured in the concentration measuring step 4) and (ii) determining whether there is an abnormality in the tetrachlorosilane reduction step 1) by comparing (a) the concentration of the solid substance, which concentration has been measured in the concentration measuring step, with (b) a reference value set in advance; and
   a step of inspecting, repairing, and/or replacing the chemical reactor in a case where the abnormality is detected; and
   5) a residue concentrating step of concentrating the residue, obtained in the crystallizing step 3), by heating the residue.

2. The solid substance concentration managing method as set forth in claim 1, wherein the concentration measuring step is carried out with use of a turbidimeter.

3. The solid substance concentration managing method as set forth in claim 2, wherein the turbidimeter is provided to a first pipe which branches off from a second pipe through which the after-crystallization residue is transferred.

4. The solid substance concentration managing method as set forth in claim 3, wherein a pressure inside each of the first pipe and the second pipe is not less than 100 kPa (gage pressure).

5. A trichlorosilane producing method comprising:
   1) a tetrachlorosilane reduction step of producing trichlorosilane by reacting metal silicon, tetrachlorosilane, and hydrogen with each other with use of a chemical reactor;
   2) a reaction product gas processing step of refining the trichlorosilane contained in a reaction product gas obtained in the tetrachlorosilane reduction step 1);
   3) a crystallizing step of crystallizing part of aluminum chloride, contained in a residue discharged in the reaction product gas processing step 2), by cooling the residue;
   4) a step of, by a solid substance concentration managing method recited in claim 1, (i) measuring a concentration of a solid substance which is contained in the residue that is obtained in the crystallizing step 3), (ii) determining, on the basis of a variation of the concentration, whether there is an abnormality in the tetrachlorosilane reduction step 1) by comparing (a) the concentration of the solid substance, which concentration has been measured in the concentration measuring step, with (b) a reference value set in advance, and (iii) inspecting, repairing, and/or replacing the chemical reactor in a case where the abnormality is detected; and
   5) a residue concentrating step of concentrating the residue, obtained in the crystallizing step 3), by heating the residue.

* * * * *